Figure 1:
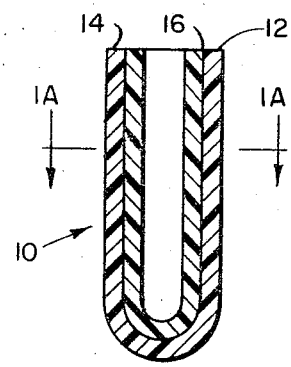

May 16, 1967 — R. M. SLIPP — 3,320,344

METHOD OF MANUFACTURING PLASTIC PRODUCTS

Filed Sept. 29, 1964 — 2 Sheets-Sheet 1

INVENTOR.
ROY M. SLIPP

BY Morse, Altman + Oates

ATTORNEYS

May 16, 1967 — R. M. SLIPP — 3,320,344
METHOD OF MANUFACTURING PLASTIC PRODUCTS
Filed Sept. 29, 1964 — 2 Sheets-Sheet 2

INVENTOR.
ROY M. SLIPP
BY Morse, Altman + Oates
ATTORNEYS

United States Patent Office 3,320,344
Patented May 16, 1967

3,320,344
METHOD OF MANUFACTURING PLASTIC PRODUCTS
Roy M. Slipp, 97 Anthony Ave., Seekonk, Mass. 02771
Filed Sept. 29, 1964, Ser. No. 400,055
4 Claims. (Cl. 264—219)

This invention relates generally to the manufacture of plastic products and more particularly is directed towards a novel method of casting compound plastic products.

The fabrication of contoured, three-dimensional plastic products by injection molding involves an initial heavy capital outlay by reason of the heavy precision molds needed for injection molding machines. Casting techniques while lower in cost, heretofore have not been used to any great extent for precision products or for a particularly wide range of articles without undergoing additional production operations such as machining and the like. Heretofore, there has been no satisfactory method of making a compound plastic product made up of two or more plastic components, at least one of which is a casting.

Accordingly, it is an object of the present invention to provide improvements in the manufacture of compound plastic products.

Another object of this invention is to provide a novel method of casting plastic products.

A further object of this invention is to provide a novel method for casting one or more plastic articles onto other plastic articles which may be in various forms and which may be other plastic castings.

A still further object of this invention is to provide a novel method of casting one plastic article over another plastic article without the development of internal stresses when the casting subsequently solidifies.

More particularly, this invention features the method of manufacturing compound plastic articles comprising the steps of casting one portion of the compound article from a liquid or semi-liquid plastic material, permitting the casting to change into a gel state and, while the casting is still in a gel state, casting another portion of the article over the first gel casting and then polymerizing both castings together. In a modification of this invention, a gel casting is applied to the surface of a solid plastic object, such as a sheet or cylinder, for example, which may be solidified or in a gel state. A further modification of the invention features the forming of inlays between two plies comprising the steps of casting an inlay from plastic and, while the casting is in a gel state, positioning it between the plies and then filling the void with a liquid plastic material which will subsequently polymerize with the pre-cast gel.

Figure 2:
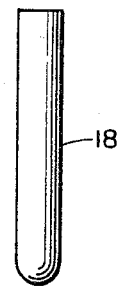
Figure 3:
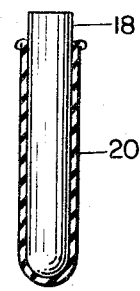
Figure 4:
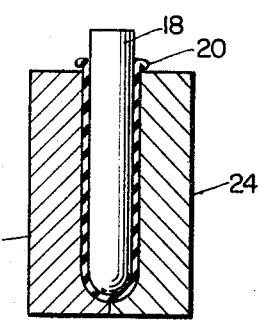
Figure 5:
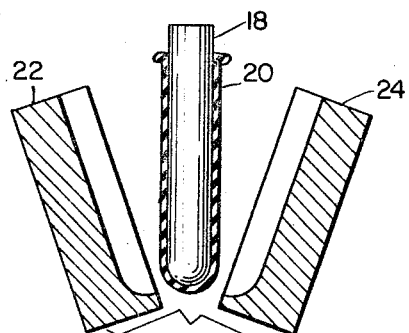
Figure 6:
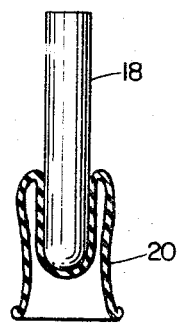
Figure 7:
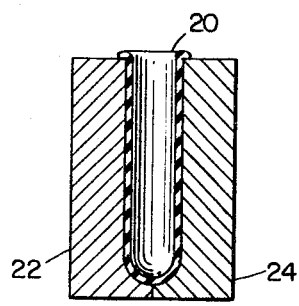
Figure 8:
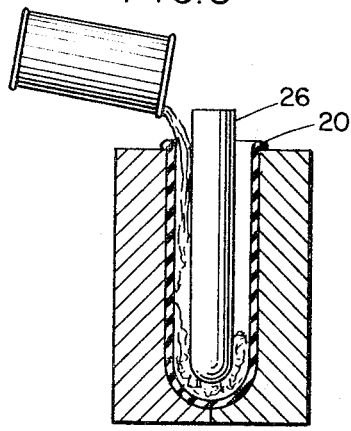
Figure 9:
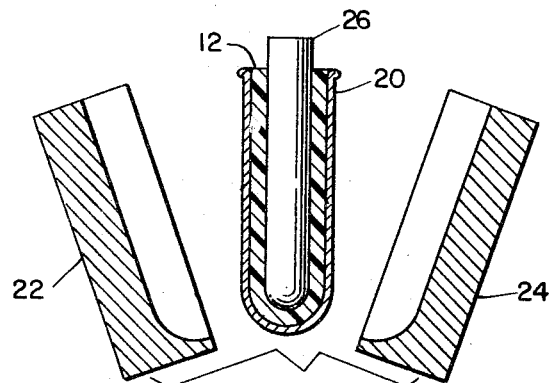
Figure 1A:
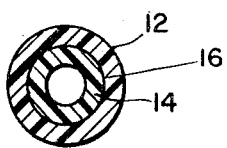
Figure 10:
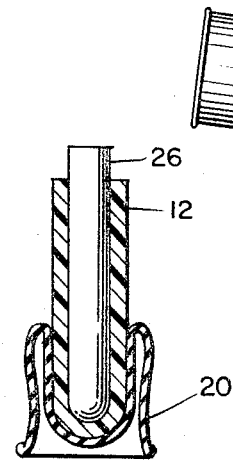
Figure 11:
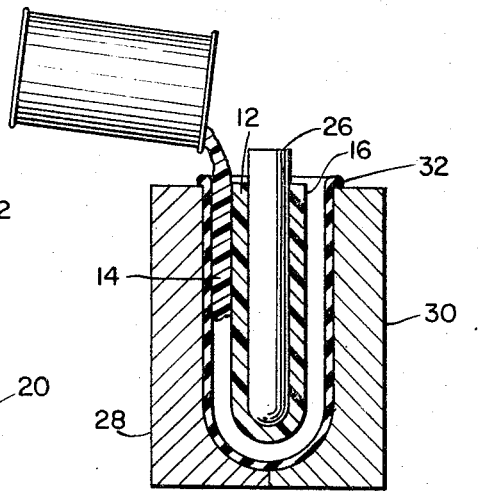
Figure 12:
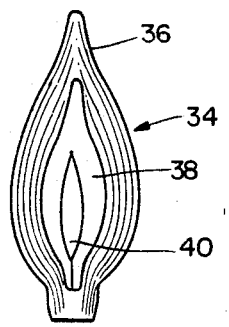
Figure 13:
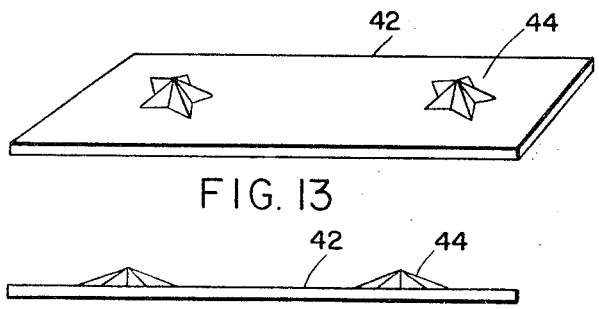
Figure 15:
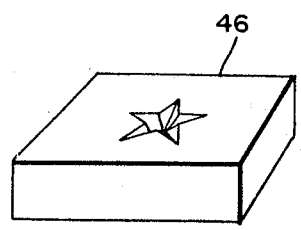
Figure 14:
Figures 16, 17:
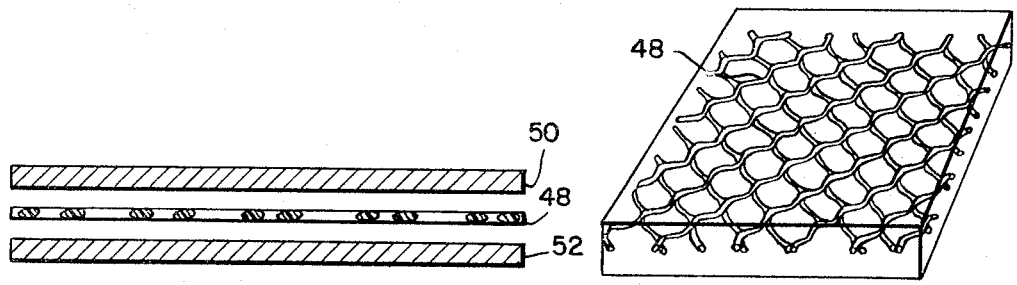

However, these and other features of the invention, along with further objects and advantages thereof, will become more fully apparent from the following description of the invention, with reference being made to the accompanying drawings, in which:

FIG. 1 is a sectional view in side elevation showing a compound plastic casting made according to the invention, FIG. 1a is a cross sectional view taken along the line 1A—1A of FIG. 1, FIG. 2 is a view in side elevation of a mandril employed in the practice of the invention, FIG. 3 is a sectional view in side elevation showing the FIG. 2 mandril with a flexible mold formed thereon, FIG. 4 is a sectional view in side elevation showing the mandril and mold of FIG. 3 having shells molded thereto, FIG. 5 is a view similar to FIG. 4 showing the shells separated from the mandril and the flexible mold, FIG. 6 is a view in side elevation showing the flexible mold being stripped from the mandril, FIG. 7 is a sectional view in side elevation showing the flexible mold lining the shell, FIG. 8 is a sectional view in side elevation showing a smaller sized mandril within the FIG. 7 assembly and a partly formed plastic casting, FIG. 9 is a view similar to FIG. 8 showing the shells partly removed from the mandril casting and flexible mold, FIG. 10 is a sectional view in side elevation showing the flexible mold being stripped from the gel casting, FIG. 11 is a cross-sectional view in side elevation showing a second casting being applied to the FIG. 10 gel casting, FIG. 12 is a sectional view in side elevation showing another compound casting made according to the present invention, FIG. 13 is a view in perspective showing a decorated panel made by a modification of the invention, FIG. 14 is a view in side elevation of the FIG. 13 panel, FIG. 15 is a view in perspective of a mold employed in fabricating the design used on the FIG. 13 panel, FIG. 16 is a view in perspective showing a panel made by another modification of the invention, and, FIG. 17 is a sectional view in side elevation of the FIG. 16 panel.

Referring now to the drawings and in particular to FIG. 1, the reference character 10 generally indicates a compound plastic casting useful in certain electrical applications and comprising two or more rigid plastic sleeves 12 and 14 fitted one within the other and having a stratum 16 of an electrically conductive material interposed therebetween. In practice, the sleeves 12 and 14 are fabricated from a plastic material which passes through a gel state when polymerizing from a liquid state. One such material which has been found to give excellent results is a transparent acrylic resin such as a slurry mix of methyl methacrylate. This slurry gels quickly, has a low shrinkage factor and quickly takes shape. This slurry may consist of 60% hardened polymers and 40% non-hardened monomers. Other materials which may be used to advantage are epoxys and polyesters which also undergo gel phases when solidifying.

The casting 10 is an integrated product fabricated by a novel casting technique to be described below and which makes possible the production of compound plastic casting in a quick, easy and inexpensive manner. The resulting casting has the further advantage of displaying no appreciable internal stresses.

In making the compound plastic casting of FIG. 1, a mandril 18, having an outside diameter corresponding to the inside diameter of the sleeve 16, is dipped in liquid latex or the like so as to be coated with a thin flexible sheath 20. Next, a two part shell 22 and 24 of plaster or the like is cast over the sheath-covered mandril 18 as suggested in FIG. 4. Once the shells 22 and 24 are hardened, they are separated from the mandril and its sheath and the sheath is peeled off the mandril as suggested in FIG. 6.

Next, the shells 22 and 24 are united and the flexible sheath 20 is inserted in the shell cavity as a liner or mold.

Now a second mandril 26 smaller than the first mandril 18 and having a diameter corresponding to the inside diameter of the sleeve 12 is inserted in the mold cavity in spaced relation to the sheath 20 as suggested in FIG. 8. With the mandril 26 in this position, a liquid or semi-liquid plastic material of the sort described above is cast or poured into the annular cavity between the mandril and the sheath 20 from the sleeve 12. The liquid plastic is then allowed to change to a gel state. Once the plastic has gelled sufficiently to be capable of retaining its cast shape and is still pliant, the shells 22 and 24 are removed as in FIG. 9 and the flexible sheath 20 is stripped therefrom as in FIG. 10.

While still in a gel state, the sleeve 12 is coated with the metallic stratum 16 and the mandril, together with its pre-cast gel sleeve, is inserted in the cavity of shell halves 28 and 30 which is provided with a flexible sheath 32. These shell halves 28 and 30 as well as the sheath 32 have been previously prepared in the same manner as the shell halves 22 and 24 and the flexible sheath 20 and described above but of a size larger than those described above whereby they form a cavity suitable for casting the sleeve 14.

With the mandril 26 suspended within the cavity of the shells 28 and 30 and spaced from the sheath 32 the sleeve 14 is cast by pouring in a liquid or semi-liquid plastic of the same sort as that used to form the first sleeve 12. Once the plastic which forms the sleeve 14 has gelled, the shell halves 28 and 30 are removed and the flexible sheath 32 is stripped from the compound casting. If no further sleeves are to be added to the compound casting, it is polymerized, normally by the application of heat and pressure so that the two sleeves shrink and solidify simultaneously and at the same rate so as not to develop stresses. Once the sleeves are fully polymerized, the mandril 26 may be removed.

The foregoing process may be employed in the manufacture of compound castings other than the sort shown in FIG. 1. For example, in FIG. 12 there is illustrated a compound plastic casting 34 in the form of a multi-colored flame such as is used in advertising displays and which may be made by the foregoing techniques. In practice, the plastic flame model 34 comprises two or more portions each of which may be of a different color or hue. For example, the flame model illustrated in FIG. 12 has a flame-shaped outer envelope 36 of light blue hue with a relatively fat mid-portion, a pointed tip portion and a restricted bottom portion. An inner envelope 38 may be of a darker bluish hue and is also the same shape as the outer envelope except of a smaller size. A center envelope 40 typically is white or clear and has a configuration similar to the outer envelopes.

Heretofore, no satisfactory technique has been available for producing a realistic translucent flame model but employing the foregoing method, a very lifelike reproduction can be made by merely substituting the cylindrical mandrils for flame-shaped cores over which flexible flame-shaped sheaths may be formed and onto which shells may be cast as was done in FIGS. 1–11. The several flame envelopes may then be cast one upon the other successively. In this instance the several layers of plastic may be colored in an appropriate manner so that the end result will be a complete plastic flame reproduction having different colors from portion to portion in the same fashion as a true flame. In practice, each flame casting while still in a gel state has the next outer flame envelope cast over it and the flame is thus progressively built up with several gel castings until the compound casting is completed. Once it is fully cast, the entire casting will be polymerized as a unit. The resulting model flame will be extremely lifelike, there being no interface boundaries apparent between the different flame envelopes. Also, by casting over gels the compound casting will polymerize uniformly so that there will be no internal stresses built up during polymerizing process.

In FIGS. 13 and 14 there is illustrated a decorated panel 42 made by a modification of the invention. In this embodiment the panel 42 is made from a rigid plastic material such as a solidified acrylic, or the like, and there is applied to the surface thereof cast designs 44 which are made by pre-cast gels. In practice, the particular design 44 is pre-cast from a suitable plastic material such as acrylic, or the like, in a mold 46 which may be flexible or rigid and fabricated by techniques of the sort disclosed in connection with the principal embodiment. In any event, a suitable plastic material in a liquid or semi-liquid state is cast into the mold cavity. When the casting has turned into a gel, it is applied to the surface of the panel 42 where it solidifies. If the mold 46 is flexible it may be peeled off the gel casting after the design has been applied to the panel whereas if the mold 46 is rigid, it is preferable to wait until the casting has completely solidified before removing the mold. In any event, one or more of pre-cast gels are placed over the panel in desired positions and the castings are then polymerized normally under the application of heat and pressure so that the castings bond themselves directly to the surface of the panel and the design and panel combine to produce an integrated, compound product.

Obviously, in place of the flat panel 44 illustrated, the designs could be applied to other shapes such as cylinders, spheres, pyramids or the like, as desired. For particular applications, any number of designs can be fabricated for application in a gel state to a supporting surface.

In FIGS. 16 and 17 there is illustrated a decorated display panel made by another modification of the invention. In this embodiment a pre-cast gel design such as a lattice 48 is placed between two panels 50 and 52 such as glass, plastic, etc. while the lattice design is still in a gel state. Once the pre-cast gel lattice is properly positioned between the two panels, the marginal edges are sealed and the void filled with a liquid plastic stratum 54 which will completely fill up the space between the two panels and the interstices of the lattice 48. The pre-cast gel latice as well as the plastic fill 54 is allowed to solidify so that the entire unit forms a rigid compound panel of unusual design and one which is particularly rugged. Various other designs may also be employed and these may be colored if desired.

While the invention has been described with particular reference to the illustrated embodiments, it will be understood that numerous modifications thereto will appear to those skilled in the art. For example, various types of plastic may be employed in place of the acrylic plastic suggested. Also, many different designs both decorative and useful may be developed by the use of pre-cast gels in connection with other gel castings or solidified components. By way of illustration, street signs and the like may be conveniently produced by applying pre-cast gels of alpha numeric characters onto a panel, which may be polymerized or in a gel state, then casting an acrylic stratum over the characters and the panel and then polymerizing the entire casting.

Accordingly, the above description and accompanying drawings should be taken as illustrative of the invention and not in a limiting sense.

Having thus described the invention, what I claim and desire to obtain by Letters Patent of the United States is:

1. A method of making a compound plastic product portions of which are of a plastic material that passes through a gel state when solidifying from a liquid state, comprising the steps of
   (a) forming a flexible mold for each of said portions,
   (b) casting one portion of said product in one of said molds,
   (c) stripping the mold from said one portion when said one portion is in a gel state,
   (d) positioning said one portion in the larger second mold for another portion,
   (e) casting said other portion in said other mold and onto said one portion while said one portion is in a gel state,
   (f) allowing said portions to solidify and unite in assembled relation.

2. The method of claim 1 including the step of subjecting the assembled gel castings to heat and pressure sufficient to polymerize said castings.

3. The method of claim 1 including the step of forming rigid shells for supporting said flexible molds during the casting steps.

4. A method of making compound plastic products at least one portion of which is a plastic material that passes through a gel state when solidifying from a liquid state and other portions of which are solidified panels comprising the steps of
(a) separately casting said one portion,
(b) assembling said one portion between said panels,
(c) filling the void between said panels with a liquid plastic while said one portion is in a gel state, and
(d) allowing said one portion to solidify and unite with one another and said panels in assembled relation.

References Cited by the Examiner

UNITED STATES PATENTS

| | | | |
|---|---|---|---|
| 2,776,225 | 1/1957 | Fletcher | 117—71 X |
| 2,917,439 | 12/1959 | Liu | 117—138.8 X |
| 3,050,785 | 8/1962 | Cunningham | 264—246 |

ROBERT F. WHITE, *Primary Examiner.*

T. J. CARVIS, *Assistant Examiner.*